US012663945B2

(12) United States Patent
    Ayalasomayajula

(10) Patent No.:    US 12,663,945 B2
(45) Date of Patent:        Jun. 23, 2026

(54) MANAGING QUEUE LIMITS FOR DATA STORAGE DEVICE ADAPTERS USING CONTROLLER MEMORY BUFFERS

(71) Applicant: Western Digital Technologies, Inc., San Jose, CA (US)

(72) Inventor: Narayan Ayalasomayajula, Sacramento, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 28 days.

(21) Appl. No.: 18/970,077

(22) Filed: Dec. 5, 2024

(65) Prior Publication Data

US 2025/0342114 A1      Nov. 6, 2025

Related U.S. Application Data

(60) Provisional application No. 63/640,936, filed on May 1, 2024.

(51) Int. Cl.
    *G06F 12/00*        (2006.01)
    *G06F 3/06*        (2006.01)
    *G06F 12/02*        (2006.01)

(52) U.S. Cl.
    CPC ............ *G06F 3/0661* (2013.01); *G06F 3/061* (2013.01); *G06F 3/0656* (2013.01); *G06F 3/0688* (2013.01); *G06F 12/0246* (2013.01); *G06F 2212/7202* (2013.01); *G06F 2212/7203* (2013.01)

(58) Field of Classification Search
    None
    See application file for complete search history.

(56)                References Cited

U.S. PATENT DOCUMENTS

| 10,838,665 B2 | 11/2020 | Gissin |
| 11,409,465 B2 * | 8/2022 | Nimmagadda ......... G06F 3/067 |
| 11,507,321 B1 | 11/2022 | Veluswamy |
| 2015/0046605 A1 | 2/2015 | Barrell |
| 2022/0342703 A1 * | 10/2022 | Hong .................... G06F 3/0679 |
| 2023/0305747 A1 | 9/2023 | Subramanian |

* cited by examiner

*Primary Examiner* — Daniel D Tsui
(74) *Attorney, Agent, or Firm* — Patent Law Works LLP

(57)                ABSTRACT

Systems, methods, and storage adapters for managing queue limits by offloading storage adapter submission queues to the controller memory buffers of data storage devices are described. The storage adapter may receive host storage commands from host devices in one format and provide those host storage commands to the data storage devices in another format for processing. The storage adapter may use submission queues in the controller memory buffers to store the host storage commands until it can preprocess them between the two formats and then notify the data storage device that the host storage command is available for processing.

20 Claims, 7 Drawing Sheets

400

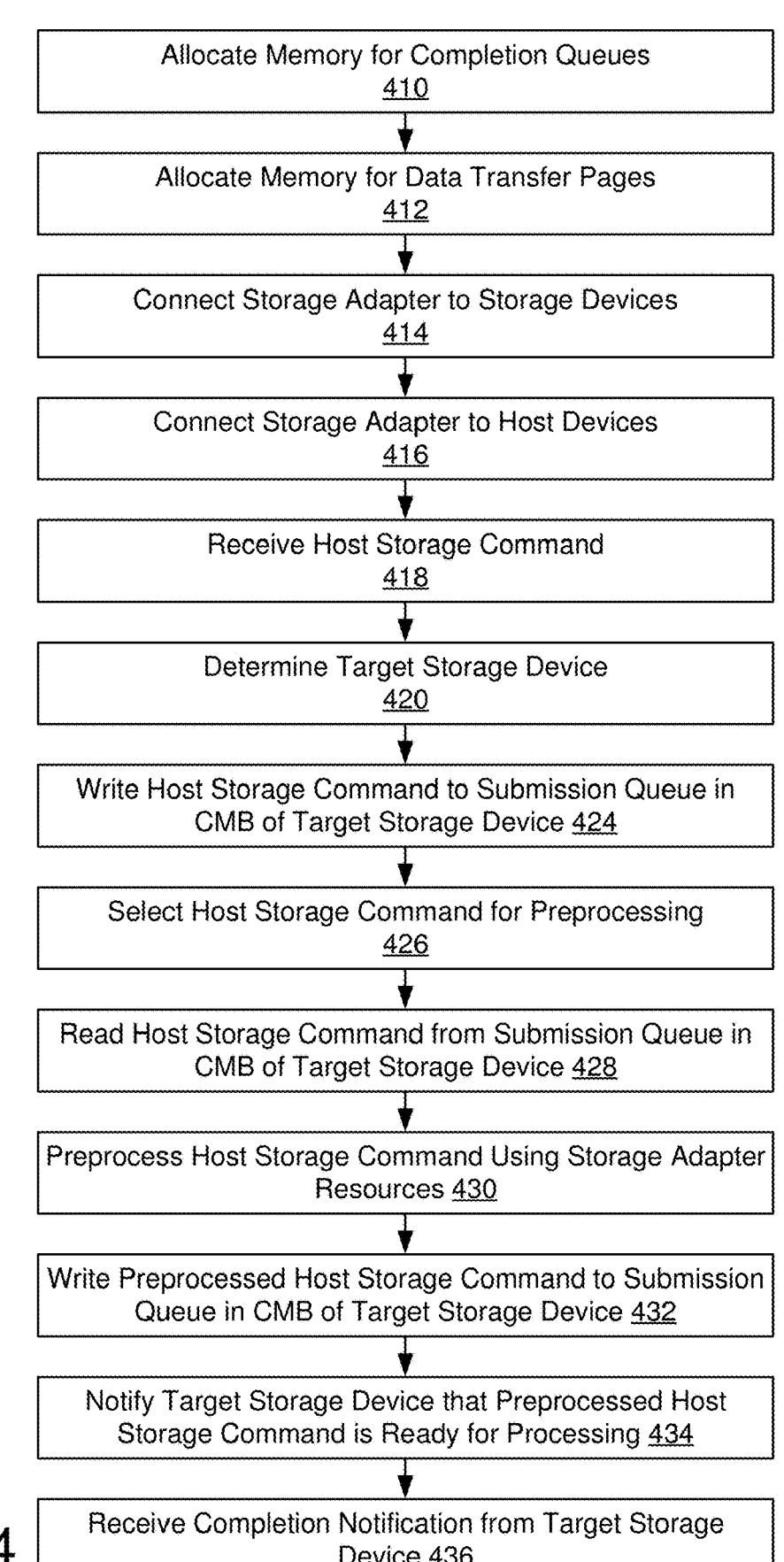

Allocate Memory for Completion Queues
410

Allocate Memory for Data Transfer Pages
412

Connect Storage Adapter to Storage Devices
414

Connect Storage Adapter to Host Devices
416

Receive Host Storage Command
418

Determine Target Storage Device
420

Write Host Storage Command to Submission Queue in CMB of Target Storage Device 424

Select Host Storage Command for Preprocessing
426

Read Host Storage Command from Submission Queue in CMB of Target Storage Device 428

Preprocess Host Storage Command Using Storage Adapter Resources 430

Write Preprocessed Host Storage Command to Submission Queue in CMB of Target Storage Device 432

Notify Target Storage Device that Preprocessed Host Storage Command is Ready for Processing 434

Receive Completion Notification from Target Storage Device 436

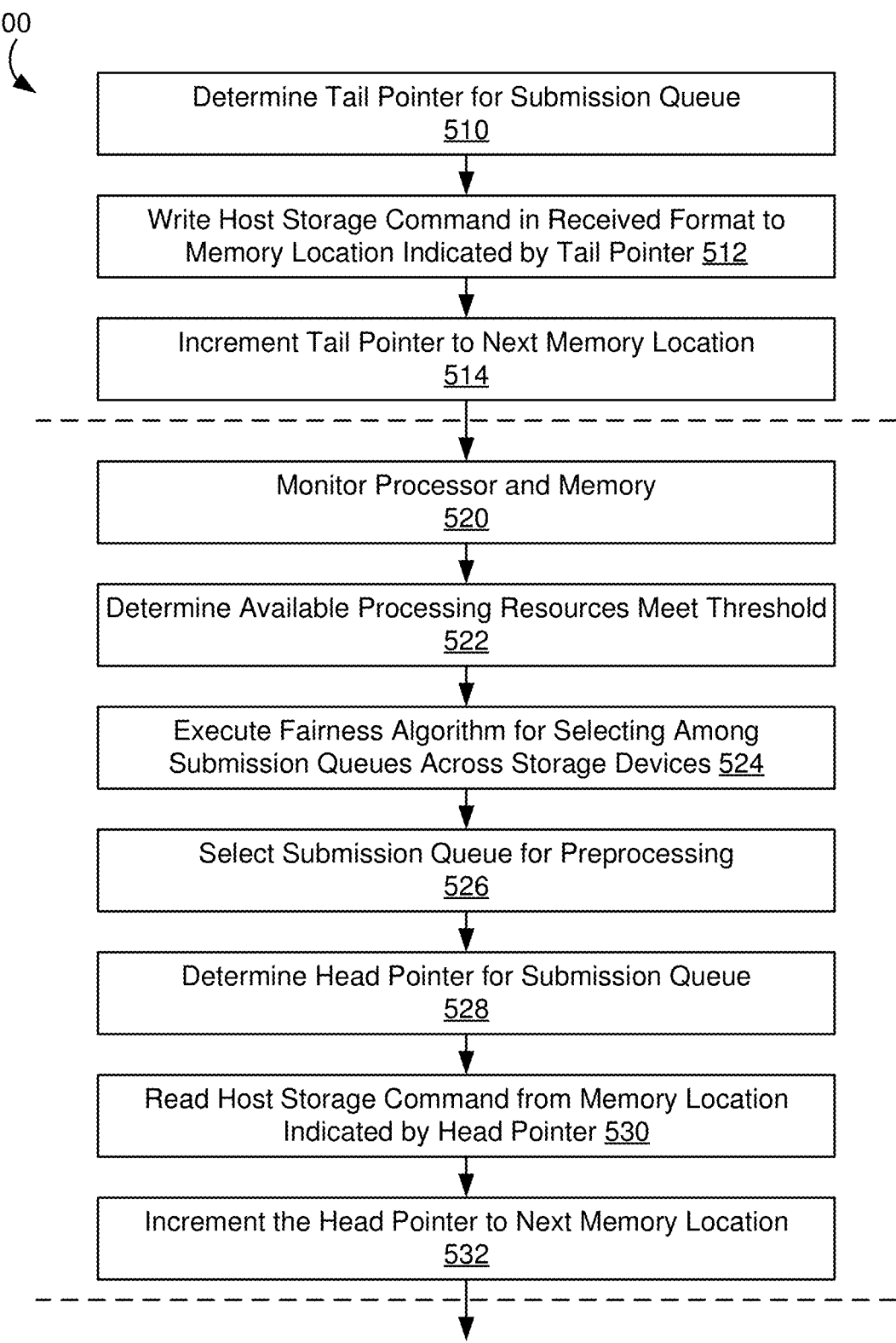

Determine Tail Pointer for Submission Queue
510

Write Host Storage Command in Received Format to
Memory Location Indicated by Tail Pointer 512

Increment Tail Pointer to Next Memory Location
514

Monitor Processor and Memory
520

Determine Available Processing Resources Meet Threshold
522

Execute Fairness Algorithm for Selecting Among
Submission Queues Across Storage Devices 524

Select Submission Queue for Preprocessing
526

Determine Head Pointer for Submission Queue
528

Read Host Storage Command from Memory Location
Indicated by Head Pointer 530

Increment the Head Pointer to Next Memory Location
532

Figures 5B, 6:
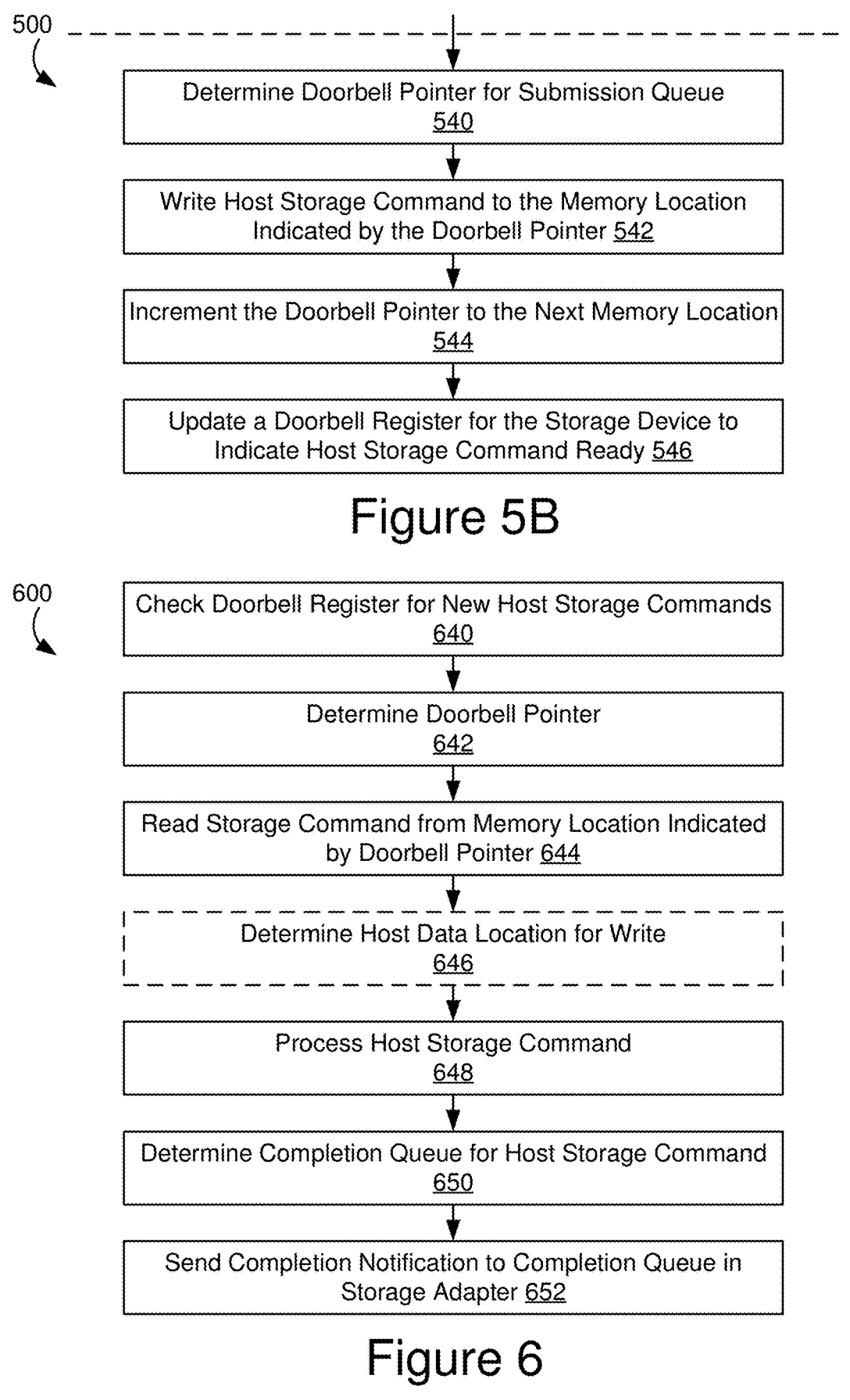

Determine Doorbell Pointer for Submission Queue
540

Write Host Storage Command to the Memory Location
Indicated by the Doorbell Pointer 542

Increment the Doorbell Pointer to the Next Memory Location
544

Update a Doorbell Register for the Storage Device to
Indicate Host Storage Command Ready 546

Check Doorbell Register for New Host Storage Commands
640

Determine Doorbell Pointer
642

Read Storage Command from Memory Location Indicated
by Doorbell Pointer 644

Determine Host Data Location for Write
646

Process Host Storage Command
648

Determine Completion Queue for Host Storage Command
650

Send Completion Notification to Completion Queue in
Storage Adapter 652

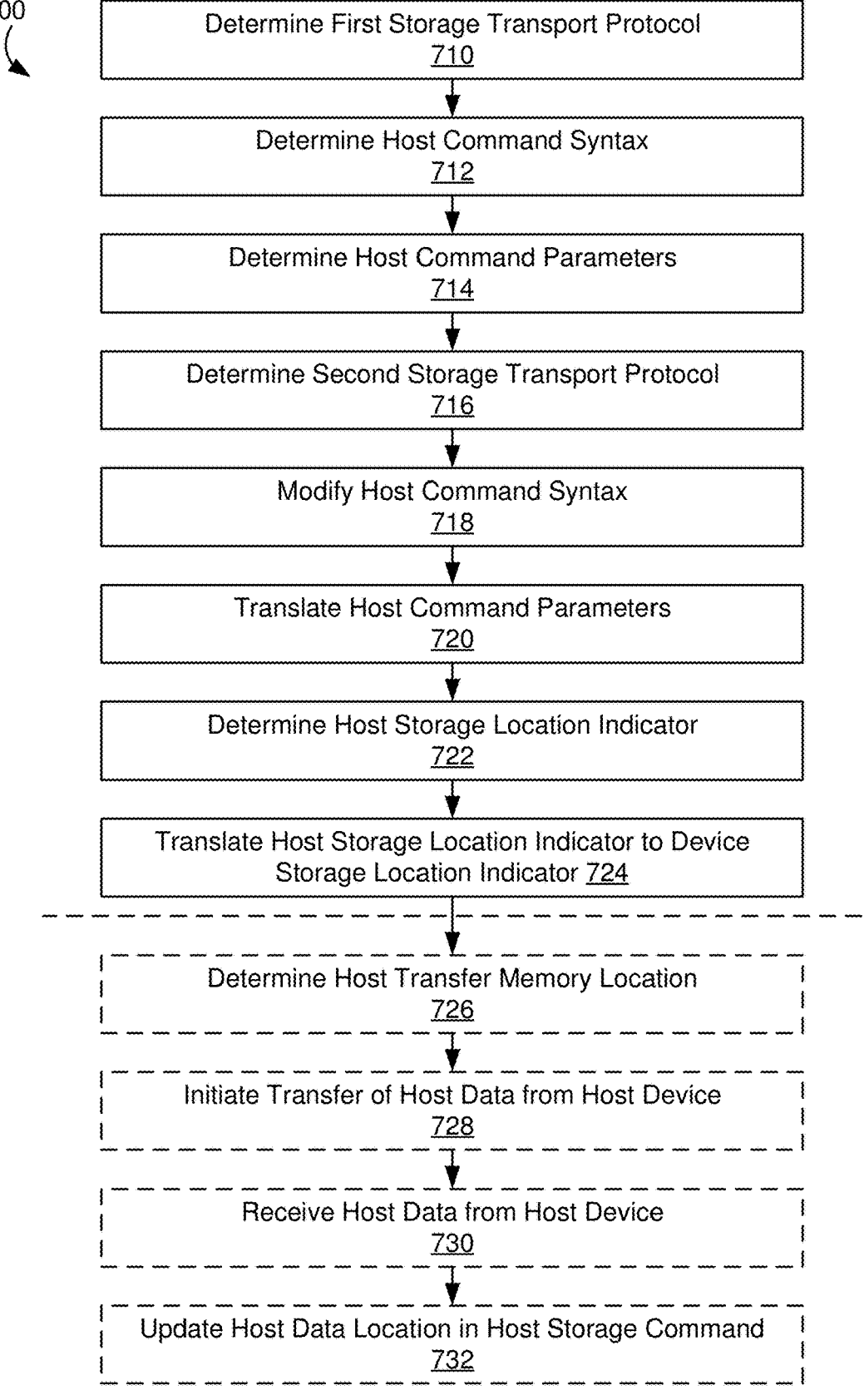

Determine First Storage Transport Protocol
710

Determine Host Command Syntax
712

Determine Host Command Parameters
714

Determine Second Storage Transport Protocol
716

Modify Host Command Syntax
718

Translate Host Command Parameters
720

Determine Host Storage Location Indicator
722

Translate Host Storage Location Indicator to Device
Storage Location Indicator 724

Determine Host Transfer Memory Location
726

Initiate Transfer of Host Data from Host Device
728

Receive Host Data from Host Device
730

Update Host Data Location in Host Storage Command
732

Figure 7

MANAGING QUEUE LIMITS FOR DATA STORAGE DEVICE ADAPTERS USING CONTROLLER MEMORY BUFFERS

TECHNICAL FIELD

The present disclosure generally relates to storage systems supporting a plurality of hosts and, more particularly, to storage adapters configured as storage protocol intermediaries between host systems and data storage devices.

BACKGROUND

Emerging storage applications using direct compute processing resources, such as graphics processing units (GPUs) that support data analytics, artificial intelligence, machine learning, and high-performance computing, require fine-grained data dependent access to storage. To meet the performance requirements for these applications, the GPUs may be configured to access storage directly with no central processing unit (CPU) intervention from the host. The data storage may reside in non-volatile memory express (NVMe) solid state drives (SSDs) that are accessed using queue semantics specified in the NVMe specifications. Due to the large scale of GPU threads executing concurrently, it may create a need for the input/output (IO) submission queues to have very large queue depths.

The applications running in the GPUs may be configured to access the data stored in NVMe SSDs through an Ethernet fabric using NVMe-over-Fabrics (NVMe-oF) protocols. In some configurations, the host systems communicate with the data storage devices over NVMe-oF target adapters that support multiple connections and corresponding sets of queue pairs for each SSD to meet the performance requirements of the GPU applications. SSDs themselves may support very large queue depths and onboard memory resources for managing large numbers of concurrent connections and corresponding queues. However, target adapters may be configured with limited memory resources allocated to queue management, intended for more limited queue depths. For example, typical NVMe-oF target solutions may be implemented with hardware offloads of the transport and storage protocols that can meet the performance requirements of non-GPU applications with support of lower queue depths. To support GPU applications, there is a need for NVMe-oF target adapters that support much larger queue depths. However, increasing the memory size allocated to queue storage may increases the cost and size of adapter electronics and may require management of additional adapter hardware configurations for GPU and non-GPU applications and attendant system manufacturing, configurations, and administrative overhead.

There is a need for a scalable adapter solution that supports larger queue depths matched to the native NVMe drive capabilities without adding any additional memory to the solution.

SUMMARY

Various aspects for using hardware adapters to manage large queue depths for data storage device arrays are described. More particularly, the hardware adapter may maintain a more limited command queuing system for command translation and pre-processing while offloading the pending submission queue to the controller memory buffer of the target data storage device. This may enable storage requests to benefit from the NVMe-OF interface and hardware offload of the transport and storage protocols, including staging of host data in the adapter memory, while utilizing the onboard memory resources of the data storage devices (which scale with number and capability of devices) to manage queue depths in excess of the memory allocations in the target adapter.

One general aspect includes a system that includes: at least one memory; a storage interface configured to communicate with a plurality of data storage devices, where each data storage device of the plurality of data storage devices is configured with a controller memory buffer configured for direct memory access through the storage interface; a host interface configured to communicate with a plurality of host devices; and at least one processor. The at least one processor is configured to, alone or in combination: receive, from a host device among the plurality of host devices, a host storage command in a first format; write, to a submission queue in the controller memory buffer of a target data storage device among the plurality of data storage devices, the host storage command in the first format; preprocess, from the submission queue in the controller memory buffer of the target data storage device, the host storage command to a second format using the at least one memory; write, to the submission queue in the controller memory buffer of the target data storage device, the host storage command in the second format; and receive, from the target data storage device, a completion notification for processing the host storage command in the second format.

Implementations may include one or more of the following features. The at least one processor may be further configured to, alone or in combination: determine a first pointer for the submission queue in the controller memory buffer of the target data storage device; write the host storage command in the first format in a memory location indicated by the first pointer; and increment the first pointer to a next memory location in the submission queue. The at least one processor may be further configured to, alone or in combination: determine a second pointer for the submission queue in the controller memory buffer of the target data storage device; read the host storage command in the first format from a memory location indicated by the second pointer; and increment the second pointer to a next memory location in the submission queue. The at least one processor may be further configured to, alone or in combination: monitor a memory availability of the at least one memory and a processing load of the at least one processor to determine available processing resources; and select, responsive to the available processing resources meeting a threshold for selecting a next host storage command for preprocessing, the host storage command in the first format from the submission queue in the controller memory buffer of the target data storage device. The at least one processor may be further configured to, alone or in combination and responsive to the available processing resources meeting the threshold for selecting the next host storage command for preprocessing, execute a fairness algorithm to select the target data storage device among the plurality of data storage devices; each data storage device of the plurality of data storage devices may be further configured with at least one submission queue in the corresponding controller memory buffer of that data storage device; and the at least one submission queue for each data storage device of the plurality of data storage devices may include at least one host storage command in the first format. The at least one processor is further configured to, alone or in combination: determine a third pointer for the submission queue in the controller memory buffer of the target data storage device;

write the host storage command in the second format to a memory location indicated by the third pointer; increment the third pointer to a next memory location in the submission queue; and update a register in the target data storage device to indicate the host storage command in the second format is ready for storage processing by the target data storage device. The target data storage device may be configured to: select, responsive to the register, the host storage command in the second format from the memory location indicated by the third pointer; process, based on the host storage command in the second format, at least one storage operation using a non-volatile storage medium of the target data storage device; and send, responsive to processing the at least one storage operation, the completion notification to a completion queue in the at least one memory. Preprocessing the host storage command may include: modifying a command syntax and at least one parameter from a first storage protocol to a second storage protocol; and translating a first storage location indicator used by the host device in the host storage command in the first format and a second storage location indicator used by the target data storage device in the host storage command in the second format. Responsive to the host storage command including a write command, preprocessing the host storage command may further include: determining a memory location in the at least one memory for transferring host data; receiving, from the host device, the host data for the write command in the memory location in the at least one memory; and updating a host data location in the host storage command in the second format to include the memory location in the at least one memory. The target data storage device may be configured to, responsive to processing the host storage command in the second format, read the host data from the memory location in the at least one memory. The system may further include a storage adapter including: the at least one processor, the at least one memory, where the at least one memory is configured for a submission queue limit that is less than submission queue limits of the plurality of data storage devices; the storage interface configured to communicate with the plurality of data storage devices; and the host interface configured to communicate with the plurality of host devices.

Another general aspect includes a computer-implemented method that includes receiving, by a storage adapter and from a host device among a plurality of host devices, a host storage command in a first format, where the storage adapter may include: at least one memory; at least one processor; a storage interface configured to communicate with a plurality of data storage devices, where each data storage device of the plurality of data storage devices is configured with a controller memory buffer configured for direct memory access through the storage interface; and a host interface configured to communicate with the plurality of host devices. The method also includes: writing, by the storage adapter and to a submission queue in the controller memory buffer of a target data storage device among the plurality of data storage devices, the host storage command in the first format; preprocessing, by the storage adapter and from the submission queue in the controller memory buffer of the target data storage device, the host storage command to a second format using the at least one memory; writing, by the storage adapter and to the submission queue in the controller memory buffer of the target data storage device, the host storage command in the second format; and receiving, by the storage adapter and from the target data storage device, a completion notification for processing the host storage command in the second format.

Implementations may include one or more of the following features. The computer-implemented method may include: determining, by the storage adapter, a first pointer for the submission queue in the controller memory buffer of the target data storage device; writing, by the storage adapter, the host storage command in the first format in a memory location indicated by the first pointer; and incrementing, by the storage adapter, the first pointer to a next memory location in the submission queue. The computer-implemented method may include: determining, by the storage adapter, a second pointer for the submission queue in the controller memory buffer of the target data storage device; reading, by the storage adapter, the host storage command in the first format from a memory location indicated by the second pointer; and incrementing, by the storage adapter, the second pointer to a next memory location in the submission queue. The computer-implemented method may include: monitoring, by the storage adapter, a memory availability of the at least one memory and a processing load of the at least one processor to determine available processing resources; and selecting, by the storage adapter and responsive to the available processing resources meeting a threshold for selecting a next host storage command for preprocessing, the submission queue in the controller memory buffer of the target data storage device. The computer-implemented method may include executing, by the storage adapter and responsive to the available processing resources meeting the threshold for selecting the next host storage command for preprocessing, a fairness algorithm to select the target data storage device among the plurality of data storage devices, where: each data storage device of the plurality of data storage devices is further configured with at least one submission queue in the corresponding controller memory buffer of that data storage device; and the at least one submission queue for each data storage device of the plurality of data storage devices includes at least one host storage command in the first format. The computer-implemented method may include: determining, by the storage adapter, a third pointer for the submission queue in the controller memory buffer of the target data storage device; writing, by the storage adapter, the host storage command in the second format to a memory location indicated by the third pointer; incrementing, by the storage adapter, the third pointer to a next memory location in the submission queue; and updating, by the storage adapter, a register in the target data storage device to indicate the host storage command in the second format is ready for storage processing by the target data storage device. The computer-implemented method may include: selecting, by the target data storage device and responsive to the register, the host storage command in the second format from the memory location indicated by the third pointer; processing, by the target data storage device and based on the host storage command in the second format, at least one storage operation using a non-volatile storage medium of the target data storage device; and sending, by the target data storage device and responsive to processing the at least one storage operation, the completion notification to a completion queue in the at least one memory. Preprocessing the host storage command may include: modifying, by the storage adapter, a command syntax and at least one parameter from a first storage protocol to a second storage protocol; and translating, by the storage adapter, a first storage location indicator used by the host device in the host storage command in the first format and a second storage location indicator used by the target data storage device in the host storage command in the second format. The computer-implemented method may include, responsive to the host storage command comprising a write command, reading, by the target data storage device, host data from a memory location in the at least one memory for processing the write command, where preprocessing the host storage command further includes: determining, by the storage adapter, the memory location in the at least one memory for transferring host data; receiving, by the storage adapter and from the host device, the host data for the write command in the memory location in the at least one memory; and updating, by the storage adapter, a host data location in the host storage command in the second format to include the memory location in the at least one memory.

Still another general aspect includes a storage adapter that includes: at least one processor; at least one memory; a storage interface configured to communicate with a plurality of data storage devices, where each data storage device of the plurality of data storage devices is configured with a controller memory buffer configured for direct memory access through the storage interface; a host interface configured to communicate with a plurality of host devices; means for receiving, from a host device among the plurality of host devices, a host storage command in a first format; means for writing, to a submission queue in the controller memory buffer of a target data storage device among the plurality of data storage devices, the host storage command in the first format; means for preprocessing, from the submission queue in the controller memory buffer of the target data storage device, the host storage command to a second format using the at least one memory; means for writing, to the submission queue in the controller memory buffer of the target data storage device, the host storage command in the second format; and means for receiving, from the target data storage device, a completion notification for processing the host storage command in the second format.

The various embodiments advantageously apply the teachings of data storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve access to non-volatile memory resources by host systems supporting applications with large numbers of concurrent storage operations, such as by using target adapter submission queues that are intermediaries to full submission queues maintained in the controller memory buffers of the target data storage devices. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

6

Figures 3A, 3B, 3C:
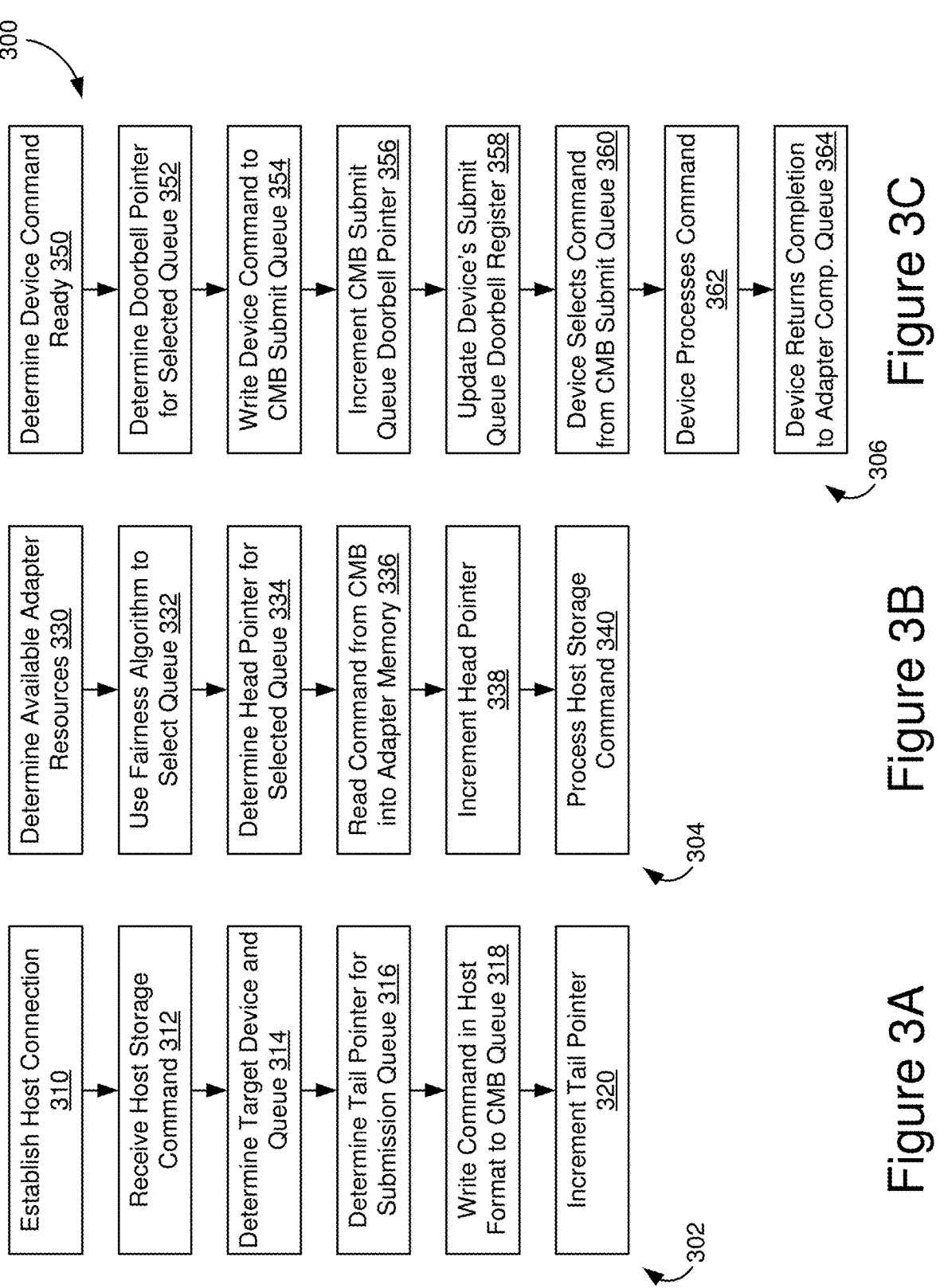

FIG. 3a is a flowchart of an example method of receiving and allocating storage commands to submission queues in the controller memory buffer of the target device.

FIG. 3b is a flowchart of an example method of preprocessing host storage commands from the submission queue in the controller memory buffer of the target device.

FIG. 3c is a flowchart of an example method of storing preprocessed storage commands back to the submission queue in the controller memory buffer for processing by the target device.

FIG. 4 is a flowchart of an example method for a storage adapter to manage offload submission queues while providing preprocessing of host storage commands.

FIGS. 5A and 5B are a flowchart of an example method for using pointers to manage the offload of submission queues.

FIG. 6 is a flowchart of an example method for a data storage device to handle host storage commands from the submission queues.

FIG. 7 is a flowchart of an example method for a storage adapter to preprocess the host storage command.

DETAILED DESCRIPTION

In some configurations, the normal mode of operation of the NVMe-oF target with hardware offload support is to advertise the maximum number of IO commands supported per connection by that hardware adapter. This maximum queue depth value may be directly dependent on the internal memory provisioning of the adapter. For example, NVMe-OF storage adapters may be configured for performance expectations based on conventional storage operation loads for non-GPU applications, such as submission queue limits or queue depths of the order of 16 to 64 on a per-connection basis. In such adapters, the adapter memory available for submission queues may be constructed based on multiplying a number of supported connections, times the command size, times the maximum queue depth to assure that when the adapter is operating at capacity across all connections, it can continue to support the advertised queue depth for each connection (which may be to different host systems with no knowledge of the pending operations of other host systems). The adapter memory for submission queues may be sized for the advertised queuing capabilities only to control the size, cost, and operating characteristics of the adapter electronics.

Additionally, in an NVMe-oF configuration, the IO commands received from the host applications may be in an NVM-OF format generated and recognized by the host systems and NVM-OF targets (e.g., NVMe-oF adapter), whereas the same command posted to the data storage device may need to be in the NVMe format recognized and processed by the device. The primary difference in the two formats may be that NVMe-oF uses Scatter Gather Lists (SGLs), possibly using Keyed SGL Data Block types, to manage logical addressing of host data units; whereas the SSDs typically use the Physical Region Page (PRP) format to specify how to access the physical memory locations associated with the IO command. The NVMe-oF target adapter may manage the mapping between the two formats and be configured to translate host storage commands in the NVMe-oF host command format to the NVMe device command format.

GPU applications may require much larger queue depths per connection and be constrained by the conventional queue depths and associated memory used to track active host commands in the NVMe-oF target adapters. Therefore, using the NVMe drive's Controller Memory Buffer (CMB)

to temporarily store the submission queues and advertise the very large native queue depth of the SSDs to the host systems may improve support for GPU applications or other configurations based on a high volume of small storage operations generated in parallel. For example, NVMe storage devices may support 65,535 queues and 65,535 commands per queue. While NVMe storage devices may be provisioned to support smaller numbers of queues and smaller submission queue limits or queue depths than the specification maximum, they are still generally at least several binary multiples (128, 256, 512, etc.) larger than the 16-64 command queue depths supported by the hardware-accelerated storage adapters. Further, offloading the submission queues to the storage device CMBs scales with the number of devices and storage adapters could be manufactured and provisioned with reduced memory or memory sized solely for host transfer pages and completion queues.

In some configurations, the adapter may use three pointers on a per submission queue basis for various purposes to continue receiving IO commands at the rate transmitted by the GPU applications, while moderating the IO processing to the SSD based on the internal processing resources of the target adapter as well as the processing speed of the target NVMe drive. The three pointers may include a head pointer, a tail pointer, and a doorbell pointer to manage command positions in each circular IO submission queue to effectively provide the large queue depths as well as facilitate transforming the format of the IO command from the NVMe-oF format that is received from the GPU applications to the NVMe format that is needed when a command is posted to the NVMe drive.

The tail pointer may be configured to index and manage the IO submission queue position for adding new host storage commands when they are received from the host systems. For example, on reception of a new IO command from the GPU applications on the Ethernet interface of the target adapter, logic in the target adapter determines which IO submit queue the command is associated with based on the host connection. The target adapter uses the tail pointer to write the new command to the corresponding IO submission queue in the CMB. The tail pointer is incremented by 1 memory location in the queue taking wrap conditions based on the size of the queue into account. The format of this command is in the NVMe-oF format and cannot be posted directly to the NVMe SSD. As more IO commands are received, they are processed similarly being placed at the tail location in the IO submission queue in the CMB and the tail pointer being incremented by 1 memory location or command position in the queue.

The head pointer may be configured to index and manage the IO submission queue position for preprocessing host commands in the NVMe-oF format and generate corresponding device commands in the NVMe format. A head pointer for each IO submission queue in the CMB may be maintained by the logic in target adapter. For example, when internal resources free up such that a new IO command can be picked up for processing by the adapter, a fairness algorithm will select the next IO submission queue in the CMB to be serviced. The command located at the head pointer of this submission queue is read out of the CMB into the target's internal memory. The head pointer is incremented by 1 taking wrap conditions based on the size of the queue into account. This command is modified to use memory locations internal to the target adapter and presented to the SSD in the NVMe format when all resources necessary for processing the command ae available. Presenting this command to the drive may involve fetching data from the host system into the target's internal memory for a write command prior to posting the device command to the SSD.

The doorbell pointer may be configured to index and manage the storage commands posted to the SSD for processing from the CMB IO submission queue. For example, when a storage command is all ready to be submitted to the SSD, the target adapter will use the doorbell index of the corresponding IO submission queue to copy the command from internal target memory to the CMB location indexed by doorbell pointer. The doorbell register is incremented by 1 memory location taking wrap conditions based on the size of the queue into account. This device command is in the NVMe format at this point and is submitted to the SSD by updating the drive's IO submission queue doorbell register.

Figure 1:
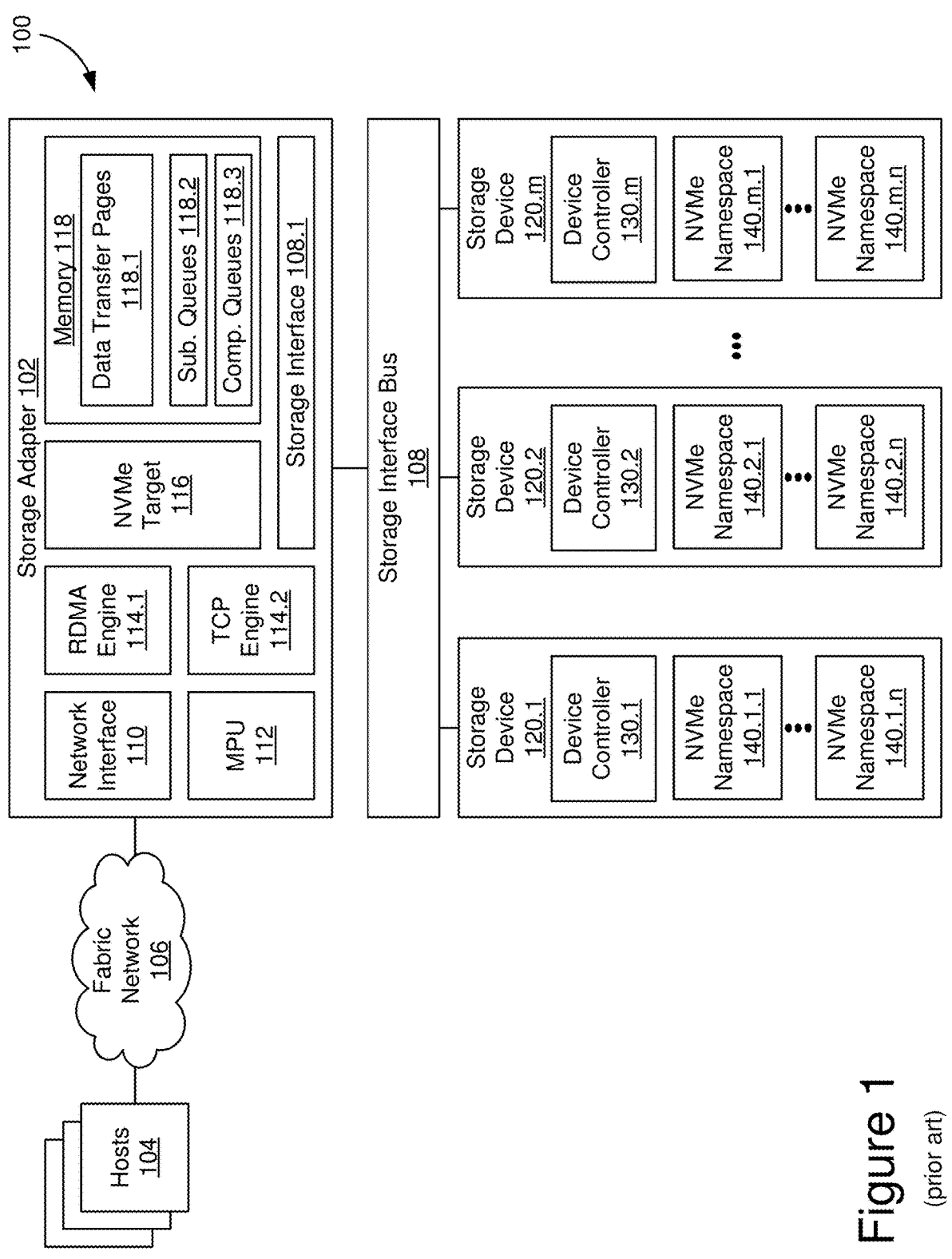
FIG. 1 schematically illustrates a multi-device storage system supporting a plurality of host systems using a storage adapter.

FIG. 1 shows an embodiment of an example data storage system 100 with multiple data storage devices 120 supporting a plurality of host systems 104 through storage adapter 102. While some example features are illustrated, various other features have not been illustrated for the sake of brevity and so as not to obscure pertinent aspects of the example embodiments disclosed herein. To that end, as a non-limiting example, data storage system 100 may include one or more data storage devices 120 (also sometimes called information storage devices, storage devices, disk drives, or drives) configured in a storage node with storage adapter 102. In some embodiments, storage devices 120 may be configured in a storage array, all flash array appliance, just-a-bunch-of-flash enclosure, or similar storage unit for use in data center storage racks or chassis. Storage devices 120 may interface with one or more host nodes or host systems 104 and provide data storage and retrieval capabilities for or through those host systems. Though only one target storage adapter 102 is shown with a corresponding set of data storage devices 120.1-120.n, any number of storage adapters 102 and corresponding sets of one or more data storage devices may be configured according to the systems and methods described below.

In the embodiment shown, a number of storage devices 120 are attached to a common storage interface bus 108 for host storage operations through storage adapter 102. For example, storage devices 120 may include a number of drives arranged in a storage array, such as storage devices sharing a common rack, unit, or blade in a data center or the SSDs in an all flash array. In some embodiments, storage devices 120 may share a backplane network, network switch(es), and/or other hardware and software components accessed through storage interface bus 108 and/or a control bus (not shown). For example, storage devices 120 may connect to storage interface bus 108 through a plurality of physical port connections that define physical, transport, and other logical channels for establishing communication with the different components and subcomponents for establishing a communication channel to hosts 104. In some embodiments, storage interface bus 108 may provide the primary host interface for storage device management and host data transfer, and a control bus may include limited connectivity to the host for low-level control functions. In some configurations, storage devices 120 may be configured for direct memory access using one or more protocols, such as NVMe, over a peripheral component interface express (PCIe) interface to storage interface bus 108 to provide command messaging and data transfer to and from storage adapter 102.

In some embodiments, data storage devices 120 are, or include, solid-state drives (SSDs). Each data storage device 120.1-120.n may include a non-volatile memory (NVM) or device controller 130 based on compute resources (processor and memory) and a plurality of NVM or media devices for data storage (e.g., one or more NVM device(s), such as one or more flash memory devices). Data storage devices 120 may be configured as NVMe drives supporting one or more NVMe namespaces 140. In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (Re-RAM), spin-transfer torque random access memory (STT-RAM), magneto-resistive random access memory (MRAM), etc.).

In some embodiments, each storage device 120 includes a device controller 130, which includes one or more processing units (also sometimes called central processing units (CPUs), processors, microprocessors, or microcontrollers) configured to execute, alone or in combination, instructions in one or more programs. In some embodiments, the one or more processors are shared by one or more components within, and in some cases, beyond the function of the device controllers. In some embodiments, device controllers 130 may include firmware for controlling data written to and read from media devices allocated to namespaces 140, one or more storage (or host) interface protocols for communication with other components, as well as various internal functions, such as garbage collection, wear leveling, media scans, and other memory and data maintenance. For example, device controllers 130 may include firmware for running the NVM layer of an NVMe storage protocol alongside media device interface and management functions specific to the storage device. Media devices are coupled to device controllers 130 through connections that typically convey commands in addition to data, and optionally convey metadata, error correction information and/or other information in addition to data values to be stored in media devices and data values read from media devices. Media devices may include any number (i.e., one or more) of memory devices including, without limitation, non-volatile semiconductor memory devices, such as flash memory device(s). In some configurations, device controllers 130 may include memory resources allocated for use and directly addressable by host-side devices (including storage adapter 102). For example, at least one internal memory device may be configured as a controller memory buffer (CMB) for direct memory access by other components of the system, such as storage adapter 102.

In some embodiments, media devices and corresponding memory locations in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. In some configurations, data units may be addressed based on physical region pages managed by device controllers 130. Media segments may include physical storage locations in the non-volatile memory devices of storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. In some configurations, storage devices 120 may be configured as NVMe devices and use a plurality of namespaces 140 to allocate physical and/or logical memory locations and/or corresponding capacity to host connections for data storage and access.

In some embodiments, host systems 104 may be coupled to data storage system 100 through fabric network 106 and storage adapter 102 may include a storage network interface, host bus adapter, or other interface capable of supporting communications with multiple host systems 104. Fabric network 106 may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. From the perspective of storage devices 120, storage interface bus 108 may be referred to as a host interface bus and provides a host data path between storage devices 120 and host systems 104, through storage adapter 102 and/or an alternative interface to fabric network 106.

Host systems 104, or a respective host in a system having multiple hosts, may be any suitable computer device, such as a computer, a computer server, or any other computing device. Host systems 104 are sometimes called a host, client, or client system. In some embodiments, host systems 104 are server systems, such as a server system in a data center. In some embodiments, the one or more host systems 104 are one or more host devices distinct from a storage node housing the plurality of storage devices 120 and/or storage adapter 102. In some embodiments, host systems 104 may include a plurality of host systems owned, operated, and/or hosting applications belonging to a plurality of entities and supporting one or more quality of service (QOS) standards for those entities and their applications. Host systems 104 may be configured to store and access data in the plurality of storage devices 120 in a multi-tenant configuration with shared storage resource pools, such as namespaces 140. In some configurations, hosts 104 may be server systems including GPUs or other high-volume compute resources.

Storage adapter 102 may include a network interface 110 in communication with fabric network 106. For example, network interface 110 may include an Ethernet interface supporting one or more Ethernet ports and corresponding network connections to fabric network 106. Storage adapter 102 may include one or more processing units or processors, such as multiprocessor 112, for executing instructions, alone or in combination, for managing the network, transport, and/or storage interface protocols for establishing communication between or among host systems 104, adapter 102, and storage devices 120. For example, multiprocessor 112 may manage network communications through network interface 110, remote direct memory access (RDMA) engine 114.1, and/or transport control protocol (TCP) engine 114.2 to NVMe target logic 116. RDMA engine 114.1 and TCP engine 114.2 may include two or more transport protocol engines for managing host communications using RDMA and/or TCP protocols to establish host connections with adapter 102. For example, RDMA engine 114.1 and TCP engine 114.2 may handle host communications in accordance with their respective protocols to establish host connections to NVMe target logic 116 to support host storage commands and data transfer to namespaces 140 in storage devices 120. In some configurations, multiprocessor 112, a central processor unit (CPU), or another processor may include a plurality of processor cores which may be assigned or allocated to parallel processing tasks and/or processing threads for different storage operations and/or host storage connections. These different processors may operate alone or in combination to execute various functions of storage adapter 102. In some configurations, multiprocessor 112 may also support processing and coordination among components for NVMe target logic 116 and storage interface 108.1. NVMe target logic 116 may include logic, data structures, and interfaces for instantiating an NVMe target in accordance with NVMe-oF protocols to support hardware offload of network transport and NVMe-OF functions to storage adapter 102 for host storage operations to storage devices 120. Storage interface 108.1 may include logic, data structures, and interfaces for managing one or more interface connections to storage devices 120. For example, storage interface 108.1 may instantiate PCIe protocols and, in some configurations, a PCIe switch for managing multiple PCIe ports and corresponding interface lanes or channels to storage devices 120.

Storage adapter 102 may include a memory 118 configured to support NVMe-oF and NVMe communications between host systems 104 and storage devices 120. In some embodiments, memory 118 may include one or more dynamic random access memory (DRAM) devices for use by host systems 104 and/or storage devices 120 for command, management parameter, and/or host data storage and transfer. Memory 118 may include memory allocations configured for specific functions and/or integrated with one or more other components of adapter 102. For example, memory 118 may include data transfer pages 118.1 configured to temporarily store host data being transferred between host systems 104 and storage devices 120. Host write commands may stage host data to data transfer pages 118.1 before being written to a target storage device 120 and host read commands may stage host data from a target storage device 120 in data transfer pages 118.1 before that data is returned to or retrieved by the host. Memory 118 may include submission queues 118.2 configured to instantiate a plurality of command queues for receiving host storage commands from host systems 104 and holding those storage commands until they can be processed by target storage devices. Memory 118 may include completion queues 118.3 configured to instantiate a plurality of response queues for receiving the storage device responses from the completion of storage commands received through submission queues 118.2. As further described below, storage adapter 102 may be configured to offload the functions of submission queues 118.2 to an alternative configuration of submission queues in the CMB of target storage devices to overcome the memory size limitations of memory 118 and utilize larger queue depths supported by storage devices 120, while still allowing storage adapter 102 to carry out the NVMe-OF transport offload and storage command translation functions of storage adapter 102.

Figure 2:
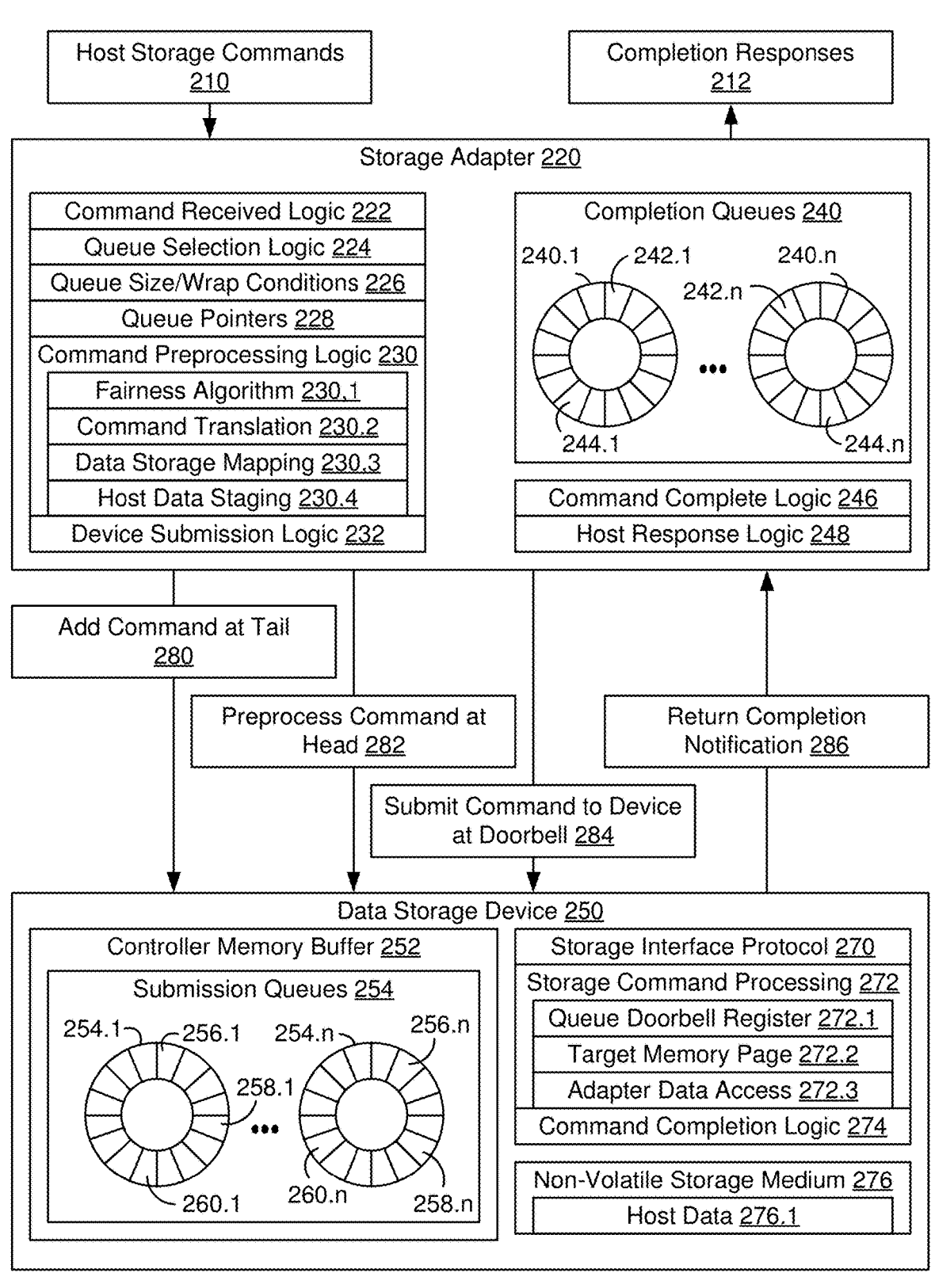
FIG. 2 schematically illustrates a configuration of storage adapter offloading submission queues to the controller memory buffer of a data storage device.

FIG. 2 shows a schematic representations of a storage system configuration 200 with a storage adapter offloading submission queues to the controller memory buffer of a data storage device. In some configurations, storage system 100 may be configured in accordance with storage system configurations 200. While only a single data storage device 250 is shown in FIG. 2, similar configurations may be used across the storage devices connected to storage adapter 220. Host storage commands 210 may be sent to storage adapter 220 as the NVMe-OF target based on connections established with one or more namespaces in data storage device 250. For example, host systems 104 may establish host connections to namespaces 140 in storage devices 120 and address host storage commands 210 to storage adapter 102 as the NVMe-OF target for those namespaces. Storage adapter 220 may provide hardware offload of the NVMe-OF transport and host-side processing to support processing of host storage commands 210 that target one or more namespaces in data storage device 250. Storage adapter 220, as an NVMe-oF target, may manage queue pairs, such as a corresponding submission queue and completion queue, allocated to each host connection mapped to namespaces in the connected data storage devices, such as data storage device 250. Submission queues may be configured to receive host storage commands 210 and completion queues may be configured to return responses to host storage commands 210 as completion responses 212. Completion responses 212 may include completion and/or error state information responsive to host storage commands 210. In the configuration shown, storage adapter 220 may manage the offloading of submission queues 254 to controller memory buffer 252 of data storage device 250, while maintaining completion queues 240 in the local memory of storage adapter 220. For example, storage adapter 220 may use an RDMA engine for direct memory access to memory locations in controller memory buffer 252 for writing to submission queues 254 and queue doorbell register 272.1.

Storage adapter 220 may include a combination of hardware and software components configured to execute various functions or operations in support of the processing of host storage commands 210 by data storage device 250, including the offload of submission queues 254 to data storage device 250. In some configurations, various logic, data structures, parameters, and interfaces may include a combination of specialized circuits and firmware or similar instructions executing on one or more hardware processors, such as multiprocessor 112 in storage adapter 102, alone or in combination.

Command received logic 222 may include functions and data structures related to receiving host storage commands 210 for processing. For example, command received logic 222 may include NVMe-oF target protocols running on storage adapter 220 to receive host storage commands 210 addressed the network address and using the transport protocol associated with the NVMe-oF target instance and corresponding host connection. Command received logic 222 may parse one or more parameters of host storage command 210 based on the command syntax defined for the NVMe-OF transport protocol, which may include parameters related to a corresponding host connection identifier, to initiate queue selection logic 224. Queue selection logic 224 may identify a corresponding submission queue among the submission queues managed by storage adapter 220 to receive host storage command 210. In some configurations, queue selection may be based on the host connection targeted by the host storage command and indicate a submission queue and completion queue for that connection. For example, a host connection identifier in the parameters of the host storage command may determine the submission queue selected by storage adapter 220. Load balancing among host connections may be managed on the host side, not by storage adapter 220. Command received logic 222 may store the received host storage command in the host format to the corresponding submission queue in submission queues 254. For example, command received logic 222 may determine a tail pointer location, add the host storage command at the tail pointer location 280, and increment the tail pointer.

Submission queues 254 may be configured with a queue size and wrap conditions 226. For example, submission queues 254 may be circular memory buffers comprised of a sequential series of memory locations or command slots configured for a predetermined command size. The number of memory locations or slots may determine the queue size or maximum queue depth supported by that queue. Queue size may be a parameter value configured in storage adapter 220 and corresponding to an offloaded queue size based on the memory available in controller memory buffer 252 and the maximum queue depth supported by data storage device 250 in terms of the number of pending commands the data storage device can manage. For example, controller memory buffer 252 for data storage device 250 may include a memory allocation for submission queues supporting a number of host connections, such as 16 host connections each supporting a queue depth of 256 commands. Wrap conditions may include a set of logical rules evaluated for determining whether to overwrite or use a next sequential memory location and may create and enforce the circular configuration of the memory buffer. Storage adapter 220 may be configured with queue size and wrap conditions 226 as a set of parameters and/or logic for manipulating offloaded submission queues 254 in controller memory buffer 252 and supporting the management of queue pointers 228. For example, storage adapter 220 may have a memory size that only supports a queue depth of 64 commands but, by using controller memory buffer 252 to offload submission queues, support a queue depth of 256 commands or more.

Queue pointers 228 may include a set of pointers for each offloaded submission queue used by storage adapter 220. Queue pointers may include data structures stored in memory for each submission queue that indicate a specific memory location in the corresponding submission queue and may be maintained and incremented to track a next memory location or command slot in the queue. For example, queue pointers 228 may include a tail pointer, a head pointer, and a doorbell pointer as described elsewhere. In the example shown, submission queues 254 may include submission queues 254.1-254.n. For each of these submission queues, storage adapter 220 may manage queue pointers 228 corresponding to the three command slot positions (tail, head, and doorbell). For example, for submission queue 254.1, storage adapter 220 may store a tail pointer value for tail command slot 256.1, a head pointer value for head command slot 258.1, and a doorbell pointer value for doorbell command slot 260.1. Similarly, for submission queue 254.n, storage adapter 220 may store another tail pointer value for tail command slot 256.n, another head pointer value for head command slot 258.n, and another doorbell pointer value for doorbell command slot 260.n. Each of these pointers may be an indicator for a memory location in submission queues 254, such as a submission queue identifier and a command slot identifier. In some configurations, queue pointers 228 may be managed as queue pointer values in a corresponding set of registers or a logical data structure in the memory of storage adapter 220. Queue pointers may also be used for managing completion queues 240. As host commands are received, preprocessed, submitted to data storage device 250, and completed, queue pointer values may be used and updated by other logic in storage adapter 220, such as command received logic 222, command preprocessing logic 230, and device submission logic 232. For example, command received logic 222 may use the tail pointer to determine where the next host storage command is stored upon receipt and then increment the tail pointer.

Command preprocessing logic 230 may include functions, data structures, and interfaces for selecting host storage commands received and stored in submission queues 254 and preprocessing them from a host format to a device format. For example, host storage commands 210 may be received in an NVMe-oF format that uses a host data storage location and data storage device 250 may be configured to receive and process NVMe commands using a different parameter for indicating the target data storage location for the host data. In some configurations, the different transport protocols used on the host side and on the device side may not have identical command syntax and logic for parsing parameters from a command in the host format may not work for the device format. Command preprocessing logic 230 may parse host storage commands 210 in the host format and translate one or more features of those host commands into a corresponding host command in the device format.

Command preprocessing logic 230 may be triggered by the availability of processing resources in the storage adapter, which may include memory locations, processor availability, and/or the availability of specialized circuitry carrying out one or more of the preprocessing functions. For example, command preprocessing logic 230 may include or access a resource monitor configured to monitor one or more operating parameters of storage adapter 220 to determine available processing resources, such as a memory availability of the operating memory or data transfer memory, a processing load of the multiprocessor, and/or the processing loads or availability of one or more specialized processing circuits for preprocessing or translating host storage commands. Command preprocessing logic 230 may include one or more threshold values for determining whether or not sufficient processing resources are available. For example, an aggregate threshold value or threshold for the most constrained resource may be used to determine whether an available processing resource threshold is met and a next command may be selected for preprocessing. In some configurations, storage adapter 220 may include sufficient processing resources to preprocess more than one host storage command in parallel. In response to command preprocessing logic 230 determining resource availability to handle a next host storage command for preprocessing, command preprocessing logic 230 may select one of submission queues 254 for preprocessing the next command. For example, command preprocessing logic 230 may include a fairness algorithm 230.1 to determine among the various submission queues (across one or more storage devices) with commands that have not yet been preprocessed. Example fairness algorithms may include round robin, weighted round-robin, and/or other algorithms for balancing the selection of which submission queue to select a command from. Note that this fairness algorithm may operate independent of how host storage commands are allocated to submission queues. For example, the host device may determine which host connections and namespaces receive which host storage commands, while fairness algorithm 230.1 may determine the order in which pending host storage commands are preprocessed by storage adapter 220. Once the target submission queue is determined, the head pointer may be used to identify the next host storage command in that queue to process.

The host storage command at the head pointer may then be read for preprocessing 282 from the controller memory buffer 252 into the memory of storage adapter 220 and transformed from host command format to device format as part of command translation 230.2. The head pointer may be incremented to indicate that the selected command is being preprocessed and a next command in the queue is available the next time resources are directed to preprocessing from that queue. In some configurations, command translation 230.2 may include modifying command syntax and parameters from one storage transport protocol to another storage transport protocol, such as between NVMe-oF and NVMe over PCIe. For example, one or more parameters may be parsed from the host format and modified in terms of position and/or values in the host command syntax to generate corresponding but syntactically different versions of the host storage command in the device format. In some configurations, command translation 230.2 may include one or more syntax or parameter value mapping rules, algorithms, or lookup tables for modifying one or more parameters between the two formats. Command preprocessing logic 230 may include or access data storage mapping 230.3 that includes logical mapping between the storage location indicators used by the host system and the storage location indicators expected by data storage device 250. For example, command translation 230.2 may include parsing a storage location in NVMe-oF format, such as a scatter gather list or Keyed SGL Data Block format, and translating the storage location using data storage mapping 230.3 to a NVMe device format, such as a target memory page. In some configurations, data storage mapping 320.2 may include mapping algorithms or translation tables for mapping host storage locations to device storage locations.

For some host storage commands, storage adapter 220 may be configured to execute target-side storage operations in preparation for processing by data storage device 250, which may see storage adapter 220 as the host for the purposes of executing the storage operation. For example, for host write commands, the host data may be staged to data transfer pages in the memory of storage adapter 220 by host data staging logic 230.4 prior to submitting the storage command to data storage device 250. Host data staging 230.4 may read the host data to be stored from a host memory location specified in the parameters of the host storage command and write that host data to a data transfer page in memory or provide a ready message to the host that signals the host to write the data to a specified data transfer page to buffer the host data for writing to data storage device 250. Command preprocessing logic 230 may complete translation, storage location mapping, and any needed host data staging prior to submitting the device command corresponding to the host storage command to data storage device 250.

Device submission logic 232 may include functions, data structures, and interfaces for submitting preprocessed host storage commands in the device format to the data storage device. For example, even though submission queues 254 and the original host storage commands are stored in controller memory buffer 252 of data storage device 250, the storage command processing functions of the storage device are unaware of pending host storage commands until they are preprocessed and submitted in the device format. Device submission logic 232 may be triggered by completion of command preprocessing logic 230 and the generation of the device command corresponding to the original host storage command. Device submission logic 232 may use the doorbell pointer for the queue the host command was originally stored to in order to determine the next available command slot for submission to data storage device 250. Device submission logic 232 may write the host storage command in the device format back to the submission queue in the command slot indicated by the doorbell pointer to submit the command to the device 284 and then increment the doorbell pointer. Device submission logic 232 may then update the device's submit queue doorbell register to notify the device that a new host storage command is available for processing.

Storage adapter 220 may maintain completion queues 240 in local memory for managing host storage command completion and notification back to the host systems that submitted the commands. In some configurations, completion queues 240 may be structured similarly to submission queues 254 as a circular buffer or register comprised of a fixed number of response slots with an appropriate response size for the protocol being used. Completion queues 240 may receive completion notification information, including completion and/or error messages. In some configurations, completion queues 240 may include a number of completion queues 240.1-240.$n$ corresponding to the number of submission queues and use tail pointers 242.1-242.$n$ and head pointers 244.1-244.$n$ to manage response slots for completion notifications from storage device 250 and completion responses received by the corresponding host systems. Completion queues may be less of a bottleneck and may not have the queue depth sensitivities of submission queues and, therefore, may not need to be offloaded to controller memory buffer 252. In some configurations, the offloading of submission queues 254 may free up memory in storage adapter 220 and enable expanded completion queues in storage adapter memory with queue depths comparable to submission queues 254. In another configuration, storage adapter memory may be further decreased and completion queues 240 may also be offloaded to controller memory buffer 252, though without the need for intermediate processing or a third pointer.

Command complete logic 246 may include functions, data structures, and interfaces for receiving completion notifications as it completes processing of host storage commands. For example, completion notifications may be written to response slots at the tail pointer in the corresponding completion queue, the tail pointer may be incremented, and an interrupt may be sent to notify the host of the available completion notification. Host response logic 248 may include functions, data structures, and interfaces for receiving acknowledgement of the completion responses to the host systems. For example, the host may provide an update to host response logic 248 to increment the head pointer as an acknowledgement that the response was received and that response slot is available for reuse for a future completion notification. In some configurations, command complete logic 246 and host response logic 248 may include additional error handling logic for managing errors that may arise from submission queue offload and/or differences in host format and device format.

Data storage device 250 may be an NVMe SSD or similar device configured for host storage operations and including a controller memory buffer 252 configured for remote access and use by host-side systems, such as storage adapter 220. As described above, controller memory buffer 252 may be used by storage adapter 220 to offload submission queues 254 and support the full queue depth capabilities of data storage device 250. Data storage device 250 may operate using a storage interface protocol 270, such as NVMe protocols over a PCIe interface to storage adapter 220. Data storage device 250 may be responsible for processing host storage commands as corresponding storage operations to non-volatile storage medium 276 for storing and manipulating host data 276.1. Data storage device 250 may include a storage device controller that includes processing and memory resources configured for executing the various host interface, storage management, and memory device interface functions. For example, data storage device 250 may include one or more processors and one or more memory devices configured for managing and executing host storage commands as corresponding backend storage operations. The one or more processors may operate alone or in conjunction to execute one or more of the functions described herein using one or more operating memory resources. Controller memory buffer 252 may be allocated within an operating memory device of the storage device that is separate from non-volatile storage medium 276 and data storage device 250 may include an RDMA engine configured to allow direct memory access to controller memory buffer 252 by other systems over the host interface, such as the PCIe connection to storage adapter 220.

Storage command processing logic 272 may include functions, data structures, and interfaces for processing host storage commands from submission queues 254 using non-volatile storage medium 276. Storage command processing logic 272 may include a submission queue doorbell register 272.1 for receiving notification that a host storage command in the device format is available in submission queues 254 for processing. For example, submission queue doorbell register 272.1 may be a memory register that is periodically updated by storage adapter 220 with a doorbell pointer value indicating the command slot containing the most recently added host storage command in the device format. Storage command processing logic 272 may sequentially process submitted commands by using the register values to access storage commands from the corresponding command slots in submission queues 254. Each command may indicate a target memory page 272.2 for the storage operation. For example, for read and write commands, storage command processing logic 272 may map a target memory page in NVMe format to a set of physical memory locations in non-volatile storage medium 276 for executing the corresponding storage operation. For write operations, storage command processing logic 272 may access a buffer location specified in the NVMe storage command to access the host data to be written to storage medium 276. In some configurations, storage command processing logic 272 may include an adapter data access protocol 272.3 to allow direct memory access for retrieving host data from data transfer pages in storage adapter 220. For example, storage command processing logic 272 may use RDMA protocols to read host data from data transfer pages in a buffer memory in storage adapter 220 for writing to storage medium 276. In some configurations, read commands may return host data to data transfer pages in the buffer memory in storage adapter 220. Command completion logic 274 may include functions, data structures, and interfaces for determining when the storage operations corresponding to host storage commands 210 have been completed (or resulted in an error condition) by storage command processing logic 272 and return a completion notification for that storage command. For example, command completion logic 274 may return a completion notification 286 to storage adapter 220 for addition to a corresponding completion queue 240. Storage of the completion notification in a corresponding response slot in the completion queue may allow the corresponding host system to receive the completion status and access any returned host data.

FIGS. 3A, 3B, and 3C show an example method 300 for receiving and processing host storage commands using a storage adapter and the controller memory buffer of a data storage device for increased submission queue capabilities. Method 300 may be executed by storage system 100 in FIG. 1 configured as described with regard to storage system 200 in FIG. 2. As shown in FIG. 3A, storage system 200 may be operated according to an example method for receiving and allocating storage commands to submission queues in the controller memory buffer of the target device, i.e., according to method 302 illustrated by blocks 310-320 in FIG. 3A.

At block 310, a host connection is established between the host system and a namespace in the data storage device through the storage adapter as a target. For example, a discovery server may expose available devices and namespaces to host systems and those host systems may initiate host connections to selected namespaces using the storage adapter as an NVMe target using NVMe-oF protocols and RDMA or TCP transport. Once a host connection is established, the host system may send any number of host storage commands through that host connection.

At block 312, a host storage command may be received by the adapter for a target namespace. For example, host systems may send storage commands to a target namespace based on connections established at block 310 and the adapter may receive those commands in accordance with NVMe-oF protocols and syntax based on the adapter's network address as an NVMe-oF target.

At block 314, a target data storage device and corresponding set of submission and completion queues for the host connection may be determined. For example, the adapter may maintain a mapping of host connections to queue pairs (submission queues and completion queues) for managing pending storage commands and responses from the host systems to the target device and namespace. The submission queue for the connection may be in a memory space allocated by the adapter in the CMB of the target device.

At block 316, a tail pointer may be determined for the submission queue in the CMB. For example, the adapter may maintain a data structure or register that includes the tail pointer value corresponding to a particular memory location or sequential queue element in the submission queue and corresponding to the next available position for new commands in the circular queue.

At block 318, the host command may be written in the received host command format to the memory location in the CMB submission queue indicated by the tail pointer. For example, the adapter may write the received host command in NVMe-oF format to the memory location in the CMB indicated by the tail pointer value.

At block 320, the tail pointer may be incremented. For example, the adapter may update the tail pointer value to correspond to the next sequential memory location in the CMB submission queue following the memory location where the host command was written at block 318.

As shown in FIG. 3B, storage system 200 may be operated according to an example method for preprocessing host storage commands from the submission queue in the controller memory buffer of the target device, i.e., according to method 304 illustrated by blocks 330-340 in FIG. 3B.

At block 330, available adapter resources may be determined. For example, the adapter may be configured with processing and memory resources for preprocessing host storage commands to prepare them for execution by the target device and, as the preprocessing of a prior command completes, determine that resources are available for preprocessing a next command, At block 332, a CMB submission queue may be selected using a fairness algorithm. For example, the adapter may determine the set of CMB submission queues having host commands that have not yet been preprocessed and use a fairness algorithm to determine which queue is selected for preprocessing a next unprocessed command.

At block 334, the head pointer for the selected CMB submission queue may be determined. For example, the adapter may maintain a data structure or register storing a head pointer value indicating a particular memory location or sequential queue element in the submission queue that corresponds to the position of a next host command that has not been processed into a device command in the circular queue.

At block 336, a host command may be read from the CMB submission queue into the memory of the adapter for preprocessing. For example, the adapter may read the host command in the NVMe-oF format from the CMB memory location indicated by the head pointer value into an adapter memory location for preprocessing the host storage command.

At block 338, the head pointer may be incremented. For example, the adapter may update the head pointer value to correspond to the next sequential memory location in the CMB submission queue following the memory location where the host command was read at block 336. The new head pointer location may correspond to the next unprocessed host command that has not yet been preprocessed into a device command.

At block 340, the host storage command may be processed to generate a corresponding device storage command for execution by the target storage device. For example, the adapter may preprocess the host command to convert the host command from the NVMe-oF format to the NVMe format used by the target device. This command processing may include mapping the target storage location from a host format to the device format. For write commands, the adapter may also initiate transfer of the host data to be written from the host system to the write buffer memory of the adapter for access by the target device when it executes the device command.

As shown in FIG. 3C, storage system 200 may be operated according to an example method for storing preprocessed storage commands back to the submission queue in the controller memory buffer for processing by the target device, i.e., according to method 306 illustrated by blocks 350-364 in FIG. 3C.

At block 350, a device command may be determined to be ready. For example, the adapter may complete the preprocessing of the host storage command initiated at block 340 to generate the corresponding host storage command for the device.

At block 352, the doorbell pointer for the CMB submission queue may be determined. For example, the adapter may maintain a data structure or register storing a doorbell pointer value indicating a particular memory location or sequential queue element in the submission queue that corresponds to the position of a next host command that has been processed into a device command in the circular queue.

At block 354, the device command may be written to the CMB submission queue at the location pointed to by the doorbell pointer. For example, the adapter may write the device command from the adapter memory after the preprocessing of the host command to the memory location in the CMB submission queue indicated by the doorbell pointer value determined at block 352.

At block 356, the CMB submission queue doorbell pointer may be incremented. For example, the adapter may update the doorbell pointer value to correspond to the next sequential memory location in the CMB submission queue following the memory location where the device command was written at block 354. The new doorbell pointer location may correspond to the next available memory location for preprocessed device commands ready for execution by the target device.

At block 358, the data storage device's submit queue doorbell register may be updated. For example, the target device may include a doorbell register in device memory that indicates that a storage command is ready for processing and provides its memory location in the CMB submission queue. The adapter may write the doorbell value determined at block 356 after the increment operation to the submit queue doorbell register of the target device to provide device notification of the pending command.

At block 360, the device command may be selected from the appropriate location in the CMB submission queue. For example, the device may select commands for processing based on the submit queue doorbell register and use the doorbell pointer value to read the corresponding device command via NVMe protocols from the memory location in the CMB submission queue.

At block 362, the device command may be processed by the data storage device. For example, the target device may process the device command to read, write, or otherwise process the host data to, in, or from, the physical storage location corresponding to the namespace and target data unit for the device command.

At block 364, a completion notification may be returned to the corresponding completion queue in the adapter memory. For example, the adapter memory may include completion queues in adapter memory that correspond to the submission queues in the CMB and provide the host system with notification of completion of the storage operations (or related errors) and, in the case of operations to return host data, a memory location for the returned host data. The host system may use the completion queue in the adapter target corresponding to the connection to which it submitted the storage command to receive the response to the command in accordance with NVMe-oF protocols.

FIG. 4 illustrates a flowchart of a method 400 for processing host storage commands using a storage adapter. The method may be executed by a storage adapter, such as storage adapter 102 or 220, in conjunction with one or more data storage devices, such as storage devices 120 or 250. The method may enable efficient processing of host storage commands by offloading submission queues to the controller memory buffer of target storage devices. This approach may allow the storage adapter to manage larger queue depths while still providing preprocessing of host storage commands.

At block 410, memory may be allocated for completion queues. For example, the storage adapter may allocate a portion of its local memory for creating and managing completion queues to store responses to host storage commands.

At block 412, memory may be allocated for data transfer pages. For example, the storage adapter may designate specific memory areas to temporarily store data being transferred between host systems and storage devices during read and write operations.

At block 414, the storage adapter may be connected to storage devices. For example, the storage adapter may establish physical and logical connections with multiple storage devices through a storage interface bus, enabling communication and data transfer.

At block 416, the storage adapter may be connected to host devices. For example, the storage adapter may set up network connections with multiple host systems through a fabric network, allowing it to receive storage commands and transfer data.

At block 418, a host storage command may be received. For example, the storage adapter may accept an incoming storage command from a host system through its network interface, using a protocol such as NVMe-oF.

At block 420, the target storage device for the command may be determined. For example, the storage adapter may analyze the received command to identify which storage device and namespace the command is intended for based on host connection information.

At block 424, the host storage command may be written to a submission queue in the CMB of the target storage device. For example, the storage adapter may use direct memory access to write the command in its original format to a specific location in the CMB of the identified target device.

At block 426, a host storage command may be selected for preprocessing. For example, the storage adapter may use a fairness algorithm to choose a command from one of the submission queues in the CMBs of connected storage devices for further processing.

At block 428, the selected host storage command may be read from the submission queue in the CMB of the target storage device. For example, the storage adapter may use direct memory access to retrieve the chosen command from the CMB and load it into its local memory for preprocessing.

At block 430, the host storage command may be preprocessed using storage adapter resources. For example, the storage adapter may translate the command from its original format (e.g., NVMe-oF) to a format compatible with the target storage device (e.g., NVMe), including mapping storage locations and preparing any associated data transfers.

At block 432, the preprocessed host storage command may be written to the submission queue in the CMB of the target storage device. For example, the storage adapter may use direct memory access to write the translated and preprocessed command back to the CMB, replacing the original command or using a new location.

At block 434, the target storage device may be notified that the preprocessed host storage command is ready for processing. For example, the storage adapter may update a doorbell register in the target storage device to indicate that a new command is available for execution.

At block 436, a completion notification may be received from the target storage device. For example, the storage adapter may receive a message from the storage device indicating that the command has been executed, which may then be used to update the corresponding completion queue and notify the host system.

FIGS. 5A and 5B illustrate a flowchart of a method 500 for using pointers to manage the offload of submission queues. The method may be executed by a storage adapter, such as storage adapter 102 or 220, in conjunction with one or more data storage devices, such as storage devices 120 or 250. The method may enable efficient management of host storage commands by utilizing different pointers for various stages of command processing. This approach may allow the storage adapter to handle large queue depths while maintaining control over command preprocessing and submission.

At block 510, a tail pointer for a submission queue may be determined. For example, the storage adapter may access a data structure or register that stores the current tail pointer value for the specific submission queue in the controller memory buffer of the target storage device.

At block 512, the host storage command may be written in its received format to a memory location indicated by the tail pointer. For example, the storage adapter may use direct memory access to write the command in its original NVMe-oF format to the location in the controller memory buffer specified by the tail pointer.

At block 514, the tail pointer may be incremented to the next memory location. For example, the storage adapter may update the tail pointer value in its data structure or register to point to the next available slot in the circular submission queue.

At block 520, following the storage of one or more host storage commands in CMB submission queues, the processor and memory may be monitored. For example, the storage adapter may continuously track its internal processing load and available memory resources to determine when it can handle preprocessing of additional commands.

At block 522, a determination may be made if available processing resources meet a threshold. For example, the storage adapter may compare its current resource utilization against predefined thresholds to decide if it can take on preprocessing of another command.

At block 524, a fairness algorithm may be executed for selecting among submission queues across storage devices. For example, the storage adapter may use a round-robin or weighted algorithm to ensure equitable processing of commands from different storage devices and host connections.

At block 526, a submission queue may be selected for preprocessing. For example, based on the fairness algorithm, the storage adapter may choose a specific submission queue from which to retrieve the next command for preprocessing.

At block 528, a head pointer for the selected submission queue may be determined. For example, the storage adapter may access its data structure or register to retrieve the current head pointer value for the chosen submission queue.

At block 530, the host storage command may be read from the memory location indicated by the head pointer. For example, the storage adapter may use direct memory access to retrieve the command from the controller memory buffer of the target storage device at the location specified by the head pointer.

At block 532, the head pointer may be incremented to the next memory location. For example, the storage adapter may update the head pointer value in its data structure or register to point to the next command to be preprocessed in the circular submission queue.

At block 540, following completion of the preprocessing of the host storage command read at block 530, a doorbell pointer for the submission queue may be determined. For example, the storage adapter may access its data structure or register to retrieve the current doorbell pointer value, which indicates the next available slot for preprocessed commands in the same submission queue the command was read from.

At block 542, the host storage command may be written to the memory location indicated by the doorbell pointer. For example, the storage adapter may use direct memory access to write the preprocessed command in NVMe format to the location in the controller memory buffer specified by the doorbell pointer.

At block 544, the doorbell pointer may be incremented to the next memory location. For example, the storage adapter may update the doorbell pointer value in its data structure or register to point to the next available slot for preprocessed commands in the circular submission queue.

At block 546, a doorbell register for the storage device may be updated to indicate that the host storage command is ready. For example, the storage adapter may write the updated doorbell pointer value to a specific register in the target storage device, signaling that a new preprocessed command is available for execution.

FIG. 6 illustrates a flowchart of a method 600 for a data storage device to handle host storage commands from the submission queues. The method may be executed by a data storage device, such as storage devices 120 or 250, in conjunction with a storage adapter, such as storage adapter 102 or 220. The method may enable efficient processing of preprocessed host storage commands that have been off-loaded to the controller memory buffer of the data storage device. This approach may allow the data storage device to handle large queue depths while maintaining synchronization with the storage adapter's preprocessing activities.

At block 640, the doorbell register may be checked for new host storage commands. For example, the data storage device may periodically poll a specific register that the storage adapter updates to indicate the presence of new preprocessed commands ready for execution.

At block 642, the doorbell pointer may be determined. For example, the data storage device may read the value from the doorbell register to identify the location in the submission queue where the next preprocessed command is stored.

At block 644, the storage command may be read from the memory location indicated by the doorbell pointer. For example, the data storage device may use its internal memory access mechanisms to retrieve the preprocessed command from the specified location in its controller memory buffer.

At block 646, the host data location for write operations may be determined. For example, if the command is a write operation, the data storage device may extract information from the preprocessed command to identify where the host data is staged, which may be in a data transfer page in the storage adapter's memory.

At block 648, the host storage command may be processed. For example, the data storage device may execute the command, which could involve reading or writing data to its non-volatile storage medium, or performing other storage operations as specified by the command.

At block 650, the completion queue for the host storage command may be determined. For example, the data storage device may identify which completion queue in the storage adapter's memory is associated with the processed command, based on the queue pair mapping particular submission queues to corresponding completion queues.

At block 652, a completion notification may be sent to the completion queue in the storage adapter. For example, the data storage device may generate a completion message containing status information, and write this message to the appropriate completion queue in the storage adapter's memory using a direct memory access operation.

FIG. 7 illustrates a flowchart of a method 700 for a storage adapter to preprocess the host storage command. The method may be executed by a storage adapter, such as storage adapter 102 or 220, in conjunction with one or more data storage devices, such as storage devices 120 or 250. The method may enable efficient translation of host storage commands between different storage command formats, addressing syntax, parameters, and storage location indicators. This approach may allow for interoperability between host devices and storage devices that may use different storage command formats.

At block 710, the first storage transport protocol may be determined. For example, the storage adapter may identify the transport protocol used by the host device to send the storage command, such as NVMe-oF.

At block 712, the host command syntax may be determined. For example, the storage adapter may parse the received command to identify its structure and format according to the first storage transport protocol.

At block 714, the host command parameters may be determined. For example, the storage adapter may extract specific parameters from the command, such as operation type, data size, or addressing information.

At block 716, the second storage transport protocol may be determined. For example, the storage adapter may identify the transport protocol used by the target storage device, such as PCIe.

At block 718, the host command syntax may be modified to align with the second transport protocol. For example, the storage adapter may restructure the command format to match the requirements of the target storage device's transport protocol.

At block 720, the host command parameters may be translated to match the requirements of the second transport protocol. For example, the storage adapter may convert addressing formats or adjust other parameters to comply with the target transport protocol.

At block 722, the host storage location indicator may be determined. For example, the storage adapter may identify the logical address specified in the original host command.

At block 724, the host storage location indicator may be translated to a device storage location indicator. For example, the storage adapter may convert a logical address used by the host to a physical page address used by the storage device.

At block 726, if the host storage command includes a host write command, the host transfer memory location may be determined. For example, the storage adapter may identify the memory address in the host system where data for a write operation is stored.

At block 728, the transfer of host data from the host device may be initiated. For example, the storage adapter may send a request to the host device to begin transferring data to a specified buffer in the adapter's memory, such as a particular data transfer page.

At block 730, the host data may be received from the host device. For example, the storage adapter may accept and store the incoming data in its designated data transfer pages.

At block 732, the host data location in the host storage command may be updated. For example, the storage adapter may modify the command to reflect the new location of the data in its own memory, preparing it for transfer to the target storage device.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology.

The invention claimed is:

1. A system, comprising:
   at least one memory;
   a storage interface configured to communicate with a plurality of data storage devices, wherein each data storage device of the plurality of data storage devices is configured with a controller memory buffer configured for direct memory access through the storage interface;
   a host interface configured to communicate with a plurality of host devices; and
   at least one processor configured to, alone or in combination:
      receive, from a host device among the plurality of host devices, a host storage command in a first format;
      write, to a submission queue in the controller memory buffer of a target data storage device among the plurality of data storage devices, the host storage command in the first format;
      preprocess, from the submission queue in the controller memory buffer of the target data storage device, the host storage command to a second format using the at least one memory;
      write, to the submission queue in the controller memory buffer of the target data storage device, the host storage command in the second format; and
      receive, from the target data storage device, a completion notification for processing the host storage command in the second format.

2. The system of claim 1, wherein the at least one processor is further configured to, alone or in combination:
   determine a first pointer for the submission queue in the controller memory buffer of the target data storage device;
   write the host storage command in the first format in a memory location indicated by the first pointer; and
   increment the first pointer to a next memory location in the submission queue.

3. The system of claim 1, wherein the at least one processor is further configured to, alone or in combination:
   determine a second pointer for the submission queue in the controller memory buffer of the target data storage device;
   read the host storage command in the first format from a memory location indicated by the second pointer; and
   increment the second pointer to a next memory location in the submission queue.

4. The system of claim 3, wherein the at least one processor is further configured to, alone or in combination:
   monitor a memory availability of the at least one memory and a processing load of the at least one processor to determine available processing resources; and select, responsive to the available processing resources meeting a threshold for selecting a next host storage command for preprocessing, the host storage command in the first format from the submission queue in the controller memory buffer of the target data storage device.

5. The system of claim 4, wherein:
   the at least one processor is further configured to, alone or in combination and responsive to the available processing resources meeting the threshold for selecting the next host storage command for preprocessing, execute a fairness algorithm to select the target data storage device among the plurality of data storage devices;
   each data storage device of the plurality of data storage devices is further configured with at least one submission queue in the corresponding controller memory buffer of that data storage device; and
   the at least one submission queue for each data storage device of the plurality of data storage devices includes at least one host storage command in the first format.

6. The system of claim 1, wherein the at least one processor is further configured to, alone or in combination:
   determine a third pointer for the submission queue in the controller memory buffer of the target data storage device;
   write the host storage command in the second format to a memory location indicated by the third pointer;
   increment the third pointer to a next memory location in the submission queue; and
   update a register in the target data storage device to indicate the host storage command in the second format is ready for storage processing by the target data storage device.

7. The system of claim 6, wherein the target data storage device is configured to:
   select, responsive to the register, the host storage command in the second format from the memory location indicated by the third pointer;
   process, based on the host storage command in the second format, at least one storage operation using a non-volatile storage medium of the target data storage device; and
   send, responsive to processing the at least one storage operation, the completion notification to a completion queue in the at least one memory.

8. The system of claim 1, wherein preprocessing the host storage command comprises:
   modifying a command syntax and at least one parameter from a first storage protocol to a second storage protocol; and
   translating a first storage location indicator used by the host device in the host storage command in the first format and a second storage location indicator used by the target data storage device in the host storage command in the second format.

9. The system of claim 8, wherein, responsive to the host storage command comprising a write command:
   preprocessing the host storage command further comprises:
      determining a memory location in the at least one memory for transferring host data;
      receiving, from the host device, the host data for the write command in the memory location in the at least one memory; and
      updating a host data location in the host storage command in the second format to include the memory location in the at least one memory; and the target data storage device is configured to, responsive to processing the host storage command in the second format, read the host data from the memory location in the at least one memory.

10. The system of claim 1, further comprising:

a storage adapter comprising;

the at least one processor;

the at least one memory, wherein the at least one memory is configured for a submission queue limit that is less than submission queue limits of the plurality of data storage devices;

the storage interface configured to communicate with the plurality of data storage devices; and the host interface configured to communicate with the plurality of host devices.

11. A computer-implemented method, comprising:

receiving, by a storage adapter and from a host device among a plurality of host devices, a host storage command in a first format, wherein the storage adapter comprises:

at least one memory;

at least one processor;

a storage interface configured to communicate with a plurality of data storage devices, wherein each data storage device of the plurality of data storage devices is configured with a controller memory buffer configured for direct memory access through the storage interface; and a host interface configured to communicate with the plurality of host devices;

writing, by the storage adapter and to a submission queue in the controller memory buffer of a target data storage device among the plurality of data storage devices, the host storage command in the first format;

preprocessing, by the storage adapter and from the submission queue in the controller memory buffer of the target data storage device, the host storage command to a second format using the at least one memory;

writing, by the storage adapter and to the submission queue in the controller memory buffer of the target data storage device, the host storage command in the second format; and receiving, by the storage adapter and from the target data storage device, a completion notification for processing the host storage command in the second format.

12. The computer-implemented method of claim 11, further comprising:

determining, by the storage adapter, a first pointer for the submission queue in the controller memory buffer of the target data storage device;

writing, by the storage adapter, the host storage command in the first format in a memory location indicated by the first pointer; and incrementing, by the storage adapter, the first pointer to a next memory location in the submission queue.

13. The computer-implemented method of claim 11, further comprising:

determining, by the storage adapter, a second pointer for the submission queue in the controller memory buffer of the target data storage device;

reading, by the storage adapter, the host storage command in the first format from a memory location indicated by the second pointer; and incrementing, by the storage adapter, the second pointer to a next memory location in the submission queue.

14. The computer-implemented method of claim 13, further comprising:

monitoring, by the storage adapter, a memory availability of the at least one memory and a processing load of the at least one processor to determine available processing resources; and selecting, by the storage adapter and responsive to the available processing resources meeting a threshold for selecting a next host storage command for preprocessing, the submission queue in the controller memory buffer of the target data storage device.

15. The computer-implemented method of claim 14, further comprising:

executing, by the storage adapter and responsive to the available processing resources meeting the threshold for selecting the next host storage command for preprocessing, a fairness algorithm to select the target data storage device among the plurality of data storage devices, wherein:

each data storage device of the plurality of data storage devices is further configured with at least one submission queue in the corresponding controller memory buffer of that data storage device; and the at least one submission queue for each data storage device of the plurality of data storage devices includes at least one host storage command in the first format.

16. The computer-implemented method of claim 11, further comprising:

determining, by the storage adapter, a third pointer for the submission queue in the controller memory buffer of the target data storage device;

writing, by the storage adapter, the host storage command in the second format to a memory location indicated by the third pointer;

incrementing, by the storage adapter, the third pointer to a next memory location in the submission queue; and updating, by the storage adapter, a register in the target data storage device to indicate the host storage command in the second format is ready for storage processing by the target data storage device.

17. The computer-implemented method of claim 16, further comprising:

selecting, by the target data storage device and responsive to the register, the host storage command in the second format from the memory location indicated by the third pointer;

processing, by the target data storage device and based on the host storage command in the second format, at least one storage operation using a non-volatile storage medium of the target data storage device; and sending, by the target data storage device and responsive to processing the at least one storage operation, the completion notification to a completion queue in the at least one memory.

18. The computer-implemented method of claim 11, wherein preprocessing the host storage command comprises:

modifying, by the storage adapter, a command syntax and at least one parameter from a first storage protocol to a second storage protocol; and translating, by the storage adapter, a first storage location indicator used by the host device in the host storage command in the first format and a second storage location indicator used by the target data storage device in the host storage command in the second format.

19. The computer-implemented method of claim 11, further comprising, responsive to the host storage command comprising a write command:

reading, by the target data storage device, host data from a memory location in the at least one memory for processing the write command, wherein preprocessing the host storage command further comprises:

determining, by the storage adapter, the memory location in the at least one memory for transferring host data;

receiving, by the storage adapter and from the host device, the host data for the write command in the memory location in the at least one memory; and updating, by the storage adapter, a host data location in the host storage command in the second format to include the memory location in the at least one memory.

20. A storage adapter comprising:

at least one processor;

at least one memory;

a storage interface configured to communicate with a plurality of data storage devices, wherein each data storage device of the plurality of data storage devices is configured with a controller memory buffer configured for direct memory access through the storage interface;

a host interface configured to communicate with a plurality of host devices;

means for receiving, from a host device among the plurality of host devices, a host storage command in a first format;

means for writing, to a submission queue in the controller memory buffer of a target data storage device among the plurality of data storage devices, the host storage command in the first format;

means for preprocessing, from the submission queue in the controller memory buffer of the target data storage device, the host storage command to a second format using the at least one memory;

means for writing, to the submission queue in the controller memory buffer of the target data storage device, the host storage command in the second format; and means for receiving, from the target data storage device, a completion notification for processing the host storage command in the second format.

* * * * *